United States Patent
Stevenson et al.

[11] Patent Number: 6,062,529
[45] Date of Patent: May 16, 2000

[54] HORIZONTAL MOUNT AIR GAP PRESETTING SENSOR BRACKET

[75] Inventors: Robin Stevenson, Bloomfield; Thaddeus Schroeder, Rochester Hills, both of Mich.

[73] Assignee: General Motors Corporation, Detroit, Mich.

[21] Appl. No.: 09/082,334

[22] Filed: May 21, 1998

[51] Int. Cl.$^7$ ............................................. F16M 1/00
[52] U.S. Cl. ................................. 248/674; 248/74.3
[58] Field of Search ........................... 248/674–680, 248/655, 222.52, 223.31, 225.11, 309.1, 669, 613, 274.1, 74.3, 68, 200

[56] References Cited

U.S. PATENT DOCUMENTS

| | | | |
|---|---|---|---|
| 2,632,217 | 3/1953 | Flora | 248/74.3 X |
| 3,049,771 | 8/1962 | Litwin et al. | 248/71 X |
| 3,552,696 | 1/1971 | Orenick | 248/74.3 |
| 3,840,095 | 10/1974 | Matson | 188/67 |
| 4,988,072 | 1/1991 | Nowak | 248/674 |
| 5,791,627 | 8/1998 | Fish et al. | 248/543 |
| 5,893,538 | 4/1999 | Onishi et al. | 248/65 |

FOREIGN PATENT DOCUMENTS

| | | | |
|---|---|---|---|
| 759179 | 10/1956 | United Kingdom | 248/74.3 |

*Primary Examiner*—Ramon O. Ramirez
*Assistant Examiner*—Tan Le
*Attorney, Agent, or Firm*—Margaret A. Dobrowitsky

[57] ABSTRACT

A sensor bracket configured to provide a vertical displacement in response to a horizontal displacement. The bracket has a general U-shape including an upper bracket section, a lower bracket section and a middle bracket section therebetween. The upper and lower bracket sections are provided with upper and lower sensor apertures, wherein the upper sensor aperture is provided with serrations which are spaced in close proximity to the sensor body, yet allow easy passage of the sensor body therepast. Remote from the middle bracket section, the lower bracket section is restrained by a bolt and the upper bracket section has a toothed slot, wherein the teeth have a predetermined pitch angle. A washer carried by the bolt is inscribed by the teeth as it is pressed into the slot by the bolt, which, in turn, causes the upper bracket section to be horizontally displaced so as to result in its bending. A pair of tabs cause squeezing of the upper bracket section at the upper sensor aperture when the upper bracket section bends to thereby grab the sensor body and vertically displace it as bending continues. Accordingly, by placing the sensor body firstly against a reluctor, the horizontal displacement results in vertical displacement of the sensor body equal to a predetermined air gap with respect to the reluctor.

16 Claims, 4 Drawing Sheets

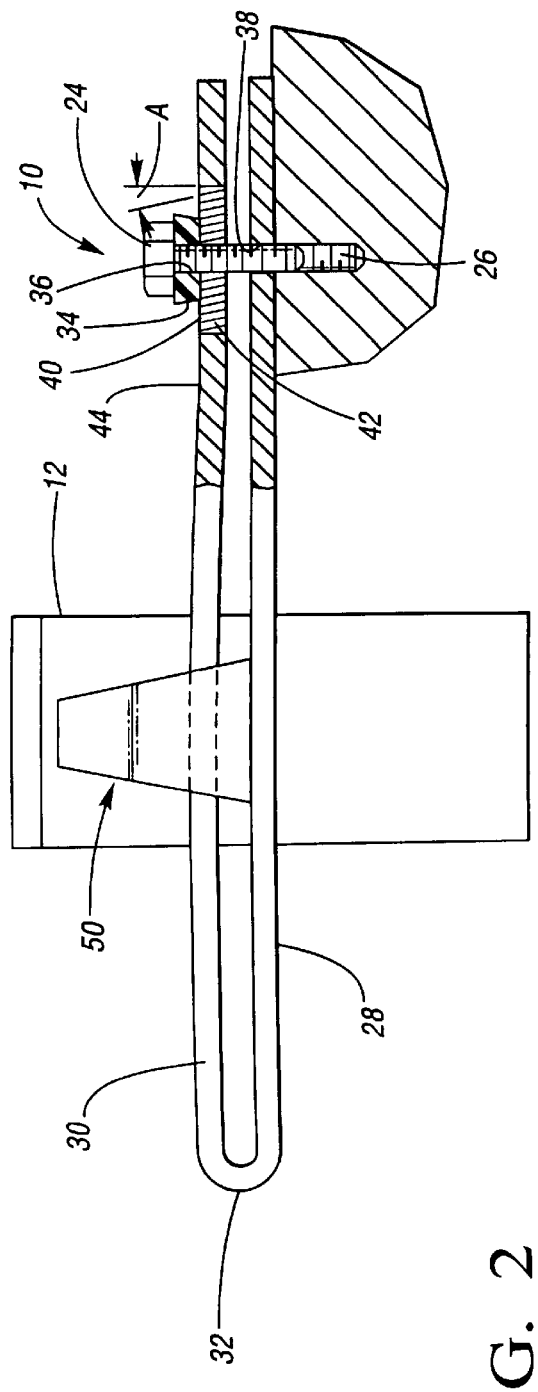
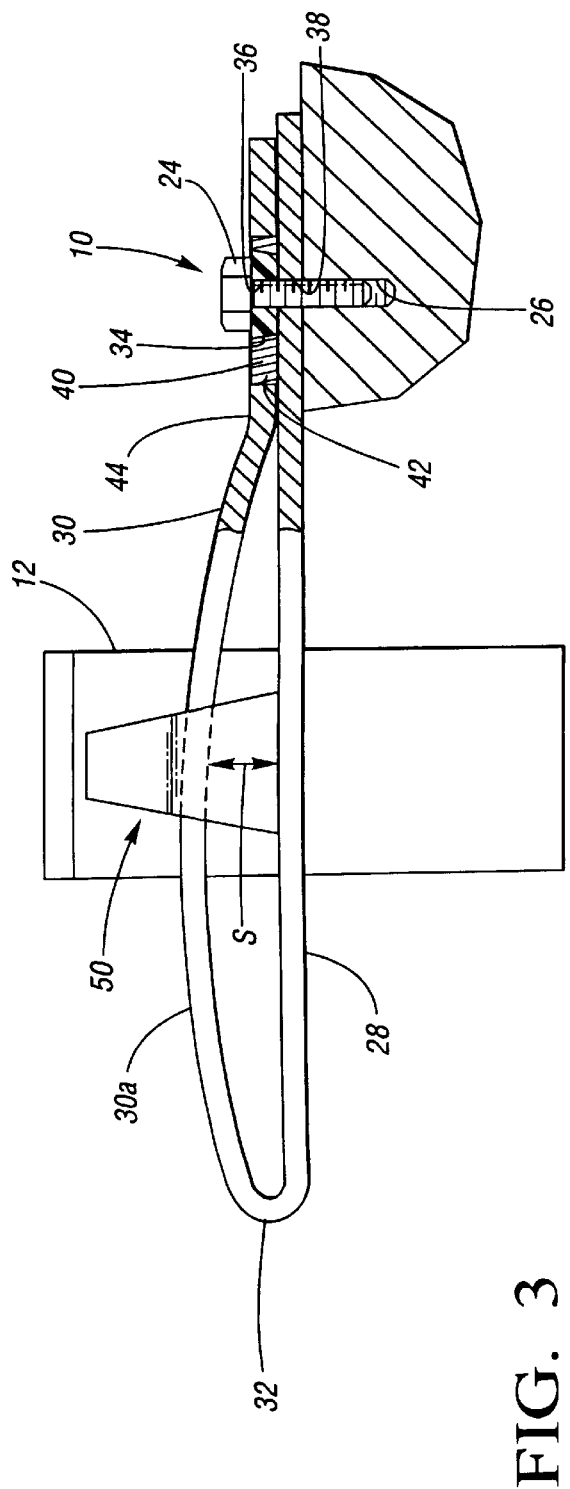

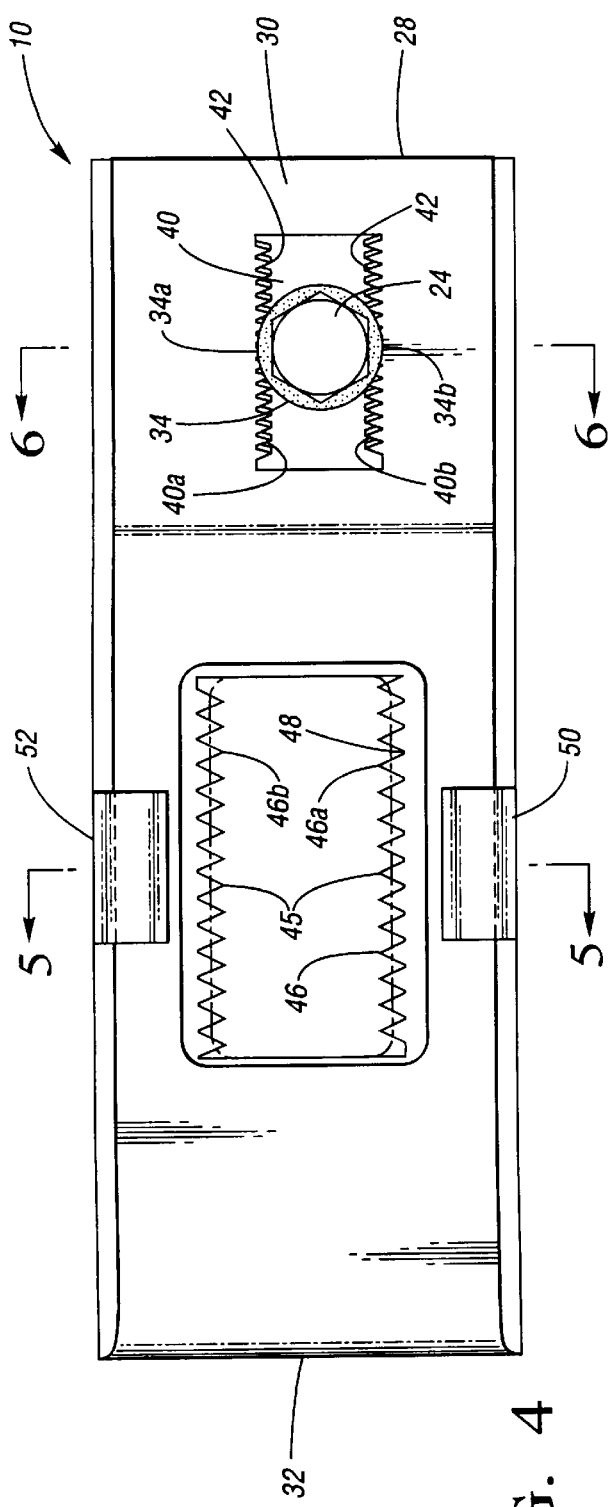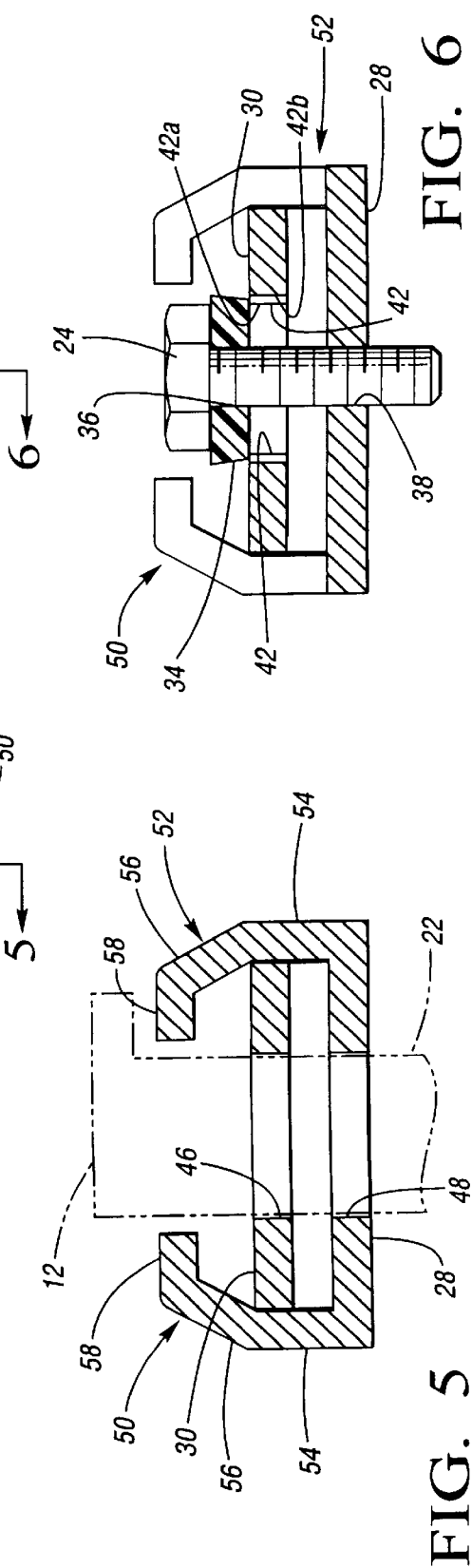

HORIZONTAL MOUNT AIR GAP PRESETTING SENSOR BRACKET

TECHNICAL FIELD

The present invention relates to brackets for holding a first object with respect to a second object. More particularly, the present invention relates to a bracket for precisely locating a sensor relative to an object to be sensed. Still more particularly, the present invention relates to a U-shaped bracket which provides a vertical displacement in response to a horizontal displacement such that a sensor housing engaged selectively therewith will move a precisely predetermined vertical distance and thereby automatically set an air gap with respect to the object to be sensed.

BACKGROUND OF THE INVENTION

Magnetic sensors operate on the principle of detecting magnetic flux density modulation caused by the movement of appropriately configured reluctors (or targets). The magnetic sensor must be affixed very close to the reluctor since its sensitivity decreases very rapidly with the size of the air gap between the reluctor and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the reluctor as it spins in relation to the magnetic sensor. Both of these factors are often unacceptable in critical engine control and diagnostic applications.

It may at first glance appear that there would be no problem whatsoever to choose and achieve an appropriate air gap between the magnetic sensor and the reluctor. However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and reluctor on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement, wherein the stack-up of tolerances causes deviation from the optimal air gap. For example, a rigid bracket is affixed to the body of a magnetic sensor. The magnetic sensor is placed into a sensor port in the engine block, and the bracket is bolted, via a bolt hole in the bracket, to a threaded mounting hole in a mounting surface of the engine block. When the bracket is bolted, the length of the sensor body from the bolt hole of the bracket to the sensor tip determines the air gap with respect to the reluctor, which air gap is affected by the stack-up of tolerances. Even though subject to tolerance related placement inaccuracy, this structural mounting methodology is used widely because of the simplicity of the hardware, and ease of assembly and service.

In situations where air gap variation cannot be tolerated, the air gap is preset during magnetic sensor installation by means of an adjustable bracket, often referred to as a "side mount" bracket. The adjustability of side mount brackets resides in a bolt slot which allows the bracket to be adjusted along the slot elongation relative to the threaded mounting hole of the mounting surface.

In one form of operation of side mount bracket, the sensor body is placed into the sensor port of the engine block such that the sensor tip is allowed to touch the surface of the reluctor, and then it is withdrawn a distance equal to the predetermined optimum air gap. This method is more time consuming and is error prone.

In another form of operation of side mount bracket, a sacrificial layer of soft abradable material is placed onto the sensor tip, wherein the thickness of the sacrificial layer is equal to the optimum air gap. Now, the installer need merely place the sensor body into the sensor port until the sensor tip touches the reluctor, and then tighten the bolt on the mounting surface with the sensor body retained at this position. During initial rotation of the reluctor, the sacrificial layer may abrade due to reluctor runout or differential thermal expansion without damage being incurred to the sensor body or the reluctor. The sacrificial layer may be either attached to the sensor body or be a part thereof, such as a protuberance, provided the sensor body is of a soft material. However, in the event the magnetic sensor must be re-installed, the abraded sacrificial layer will not be able to again provide position location as it was able to do when unabraded. Therefore, before dismounting the magnetic sensor, the bracket must be marked to indicate the correct position of the sensor body relative to the bolt so that when the magnetic sensor is re-installed the mark on the bracket can be sighted—not an exact procedure. In any event, should the sacrificial layer be exposed to a lubricating oil, the oil spray may carry the abraded debris into oil passageways.

In the prior art, it is known to precisely adjust the air gap using a threaded sensor body and threaded sensor port. This structure is generally used exclusively with magnetic sensors having a single sensing element and having sensing capability unaffected by sensor rotation around its longitudinal axis. In this approach, the sensor tip is brought into touching engagement with the reluctor, and then the sensor body is rotated a predetermined angular amount, wherein the pitch angle of the threads raises the tip a distance equal to the optimum air gap. However, many automotive magnetic sensors contain more than one sensing element and are designed to operate at only one particular angular setting around the sensor axis. Consequently, a threaded sensor body would need to be adjusted in whole revolution steps (i.e., 360 degrees) and air gap adjustment would then be in steps of the thread pitch. While the use of a sufficiently small pitch may render the air gap setting resolution adequate, many sensors are precluded from rotation due to geometrical interferences and cost.

Accordingly, what is needed in the art is a structure for holding a magnetic sensor which allows easy and quick re-installation and removal of the magnetic sensor, and provides for automatic setting of an optimal air gap.

SUMMARY OF THE INVENTION

The present invention is a sensor bracket configured to provide a vertical displacement in response to a horizontal displacement.

The bracket according to the present invention has a general U-shape including an upper bracket section, a lower bracket section and a middle bracket section connecting the upper and lower bracket sections. The upper and lower bracket sections are provided with upper and lower sensor apertures, respectively, for receiving therethrough the sensor body of a sensor. The upper sensor aperture is provided with serrations which are spaced in close proximity to the sensor body, yet allow easy passage of the sensor body therepast. The shape of the sensor body in relation to the upper and/or sensor apertures prevents rotation of the sensor body relative to the bracket, and the sensor body is captured on the bracket which allows for limited vertical movement relative thereto.

Opposite the middle bracket section, the lower bracket section has a bolt hole for snugly receiving a bolt therethrough. Vertically above the bolt hole, a toothed slot is provided in the upper bracket section, wherein the teeth run parallel on opposing sides thereof at a predetermined acute angle relative to the plane of the lower bracket section. A washer composed of a material softer than that of the upper bracket section is captured by the bolt and is configured to be cut into by the teeth when the bolt drives the washer into the toothed slot.

A pair of mutually opposed tabs are upstandingly connected with the lower bracket section, and are located at either side of the upper and lower sensor apertures. The tabs are bent mutually inward such that the upper bracket section are increasingly squeezed therebetween when the upper bracket section is bendingly displaced away from the lower bracket section.

An example of operation will be given for an automotive environment of operation, wherein the bracket is secured to an engine block and is used to support a magnetic sensor at a predetermined air gap with respect to a rotative reluctor.

An installer places the lower bracket section onto the engine block, placing the sensor body into the sensor port and aligning the bolt hole of the lower bracket section over a threaded bolt hole in the engine block. A bolt with captured washer is loosely threaded into the threaded bolt hole and the upper and lower sensor apertures are aligned over a sensor port in the engine block. The installer then checks to make certain the tip of the sensor body touches the reluctor. At this point the serrations of the upper sensor aperture nearly touch the sensor body.

Now, as the installer tightens the bolt, the washer engages the teeth and, since the teeth have a predetermined acute pitch angle and the washer is restrained from moving laterally by the bolt, the upper bracket section adjacent the slot is caused to move laterally toward the middle bracket section. However, this lateral movement of the upper bracket section is restricted by the lower bracket section, which is, itself, restrained by the bolt. Consequently, the lateral movement of the upper bracket section adjacent the slot is relieved by bending upwardly of a bendable portion of the upper bracket section.

As the bendable portion of the upper bracket section bends upwardly away from the lower bracket section, the opposite sides thereof strike the tabs. The inward bend angle of the tabs causes the upper bracket section at the upper sensor aperture to be increasingly squeezed therebetween as the bendable portion of the upper bracket section ascends relative to the lower bracket section. Consequently, the serrations of the upper sensor aperture grip the sensor body and thereby cause the sensor body to ascend concomitantly with the ascension of the bendable portion of the upper bracket section. Upon the bolt becoming tightened, the tip of the sensor body will have moved away from the reluctor a predetermined amount equal to an air gap for optimum functioning of the magnetic sensor relative to the reluctor.

Accordingly, it is an object of the present invention to provide a bracket for supporting a sensor, wherein location of the sensor is determined by a bending of a portion of the bracket in response to a selected horizontal displacement of part of the bracket.

It is another object of the present invention to provide a bracket for supporting a sensor, wherein bending of a portion of the bracket in response to a selected horizontal displacement of a part of the bracket results in placement of the sensor at predetermined air gap relative to an object to be sensed.

These, and additional objects, advantages, features and benefits of the present invention will become apparent from the following specification.

BRIEF DESCRIPTION OF THE DRAWINGS

FIG. 2 is a partly sectional side view of the bracket of FIG. 1, wherein a sensor is about to be located by operation of the bracket.

FIG. 3 is a partly sectional side view of the bracket similar to FIG. 2, wherein now the magnetic sensor has been located by operation of the bracket.

FIG. 4 is a top plan view of the bracket according to the present invention.

FIG. 5 is a partly sectional view, seen along line 5—5 of FIG. 4, wherein the sensor (shown in phantom) is about to be located by operation of the bracket.

FIG. 6 is a partly sectional side view, seen along line 6—6 of FIG. 4, wherein the bracket is operationally in the state of FIG. 5.

DESCRIPTION OF THE PREFERRED EMBODIMENT

Figure 1:
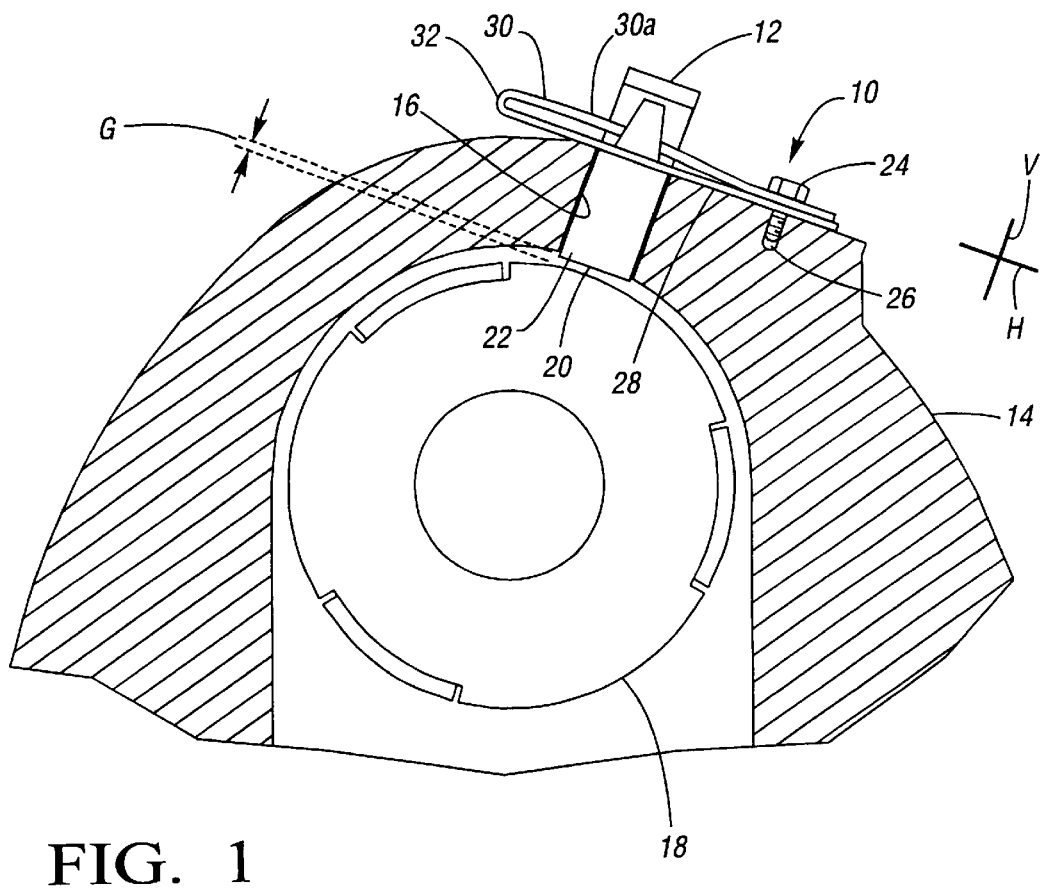
FIG. 1 is a partly sectional side view of the bracket according to the present invention, shown in a typical environment of operation wherein a magnetic sensor is spaced from a reluctor a distance equal to an optimum air gap.
Figure 11:
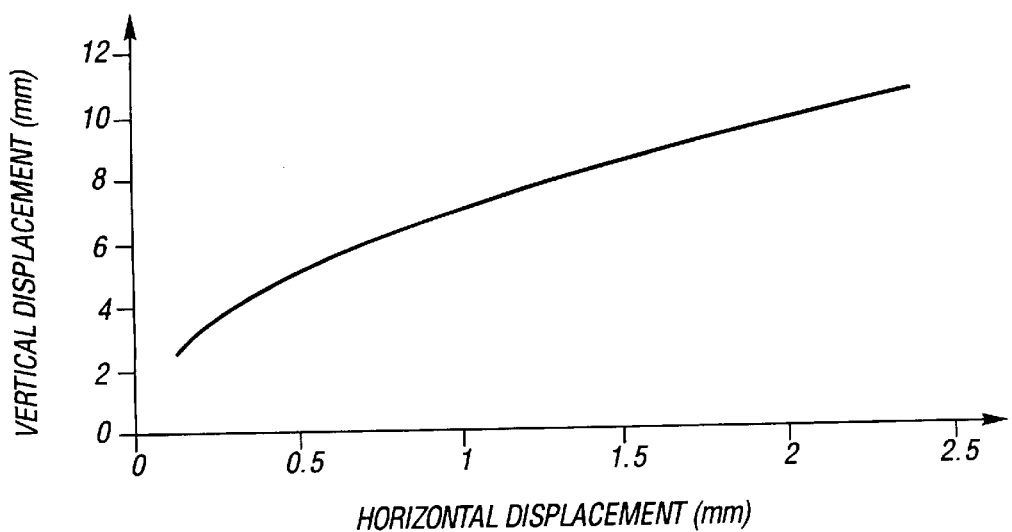
FIG. 11 is a graph showing the expected vertical displacements of the bracket in response to increasing horizontal displacement thereof.
Figure 7:
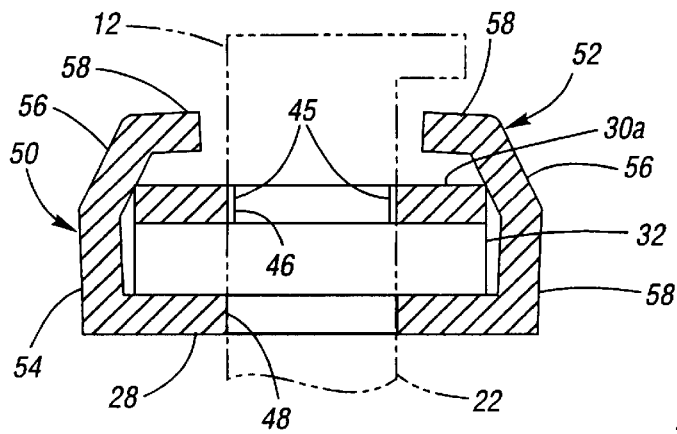
FIG. 7 is a partly sectional view similar to FIG. 5, wherein now the sensor (shown in phantom) has been located by operation of the bracket.
Figure 8:
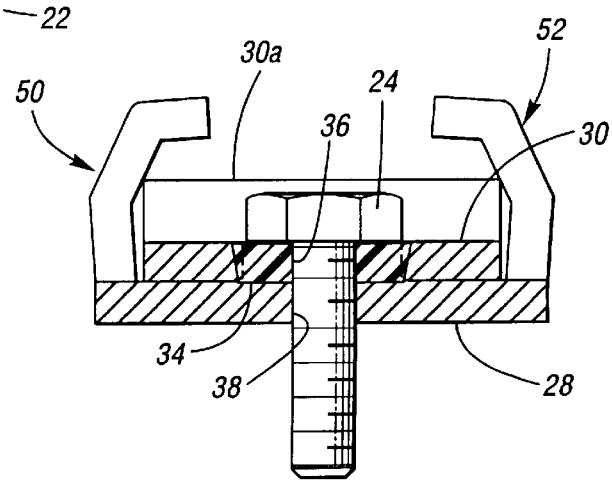
FIG. 8 is a partly sectional side view similar to FIG. 6, wherein now the bracket is operationally in the state of FIG. 7.

Referring now to the drawings, FIG. 1 depicts the bracket 10 according to the present invention in operation supporting a magnetic sensor 12 with respect to an engine block 14. The engine block 14 includes a sensor port 16 for receiving thereinto the magnetic sensor 12. Within the engine block 14 is a rotatably mounted reluctor 18, the magnetic characteristics of which are sensed by the magnetic sensor 12 as the reluctor rotates with respect to the magnetic sensor. In this regard, the bracket 10 positions the tip 20 of the sensor body 22 of the magnetic sensor at a predetermined air gap G with respect to the reluctor 18 to thereby provide optimum sensing performance of the magnetic sensor relative to the reluctor. In order to securely connect the bracket 10 relative to the engine block, a bolt 24 is threadably engaged into a threaded bolt hole 26 in the engine block 14.

As can be understood by further review of FIG. 1, the bracket 10 is generally U-shaped, characterized by a lower bracket section 28, an upper bracket section 30 and a preferably curved middle bracket section 32 connecting the lower and upper bracket sections. Operation of the bracket 10 is based upon the upper bracket section 30 being horizontally displaced along the horizontal axis H toward the middle bracket section 32, which results in an upward curving of a bending portion 30a of the upper bracket in a direction upwardly away from the lower bracket section 28 and, consequently, raising the sensor body 22 along the vertical axis V to thereby provide the predetermined air gap G.

Referring now also to FIGS. 2 through 11, the structure and function of the bracket 10 will be further detailed.

As can be understood by reference to FIGS. 2, 3, 4 and 6, the horizontal displacement of the upper bracket section 30 is provided by sliding engagement therewith of a washer 34 that is carried on the bolt 24. The washer 34 has a bolt hole 36 for slidably, yet snugly, receiving the bolt 24. The lower bracket section 28 is also provided with a bolt hole 38 which similarly receives the bolt 24 in a slidable, yet snug, manner. The upper bracket section 30 is provided with a slot 40 which is structured to receive the washer 34 in a manner whereby a toothed engagement therebetween transpires. The toothed engagement may involve either the slot being toothed (as discussed immediately hereinbelow) or the washer being toothed (as will be discussed hereinbelow subsequently with regard to FIGS. 9 and 10).

As shown at FIGS. 2, 3, 4 and 6, the slot 40 has left and right sidewalls 40a, 40b which are provided with a plurality of mutually parallel teeth 42. The teeth 42 are oriented at both the left and right sidewalls 40a, 40b according to a predetermined pitch angle P as measured with respect to the vertical axis V (see FIG. 1). The teeth 42 may be finely spaced or coarsely spaced, and may be in any suitable form, such as for example serrations, cutting ridges or cutting surfaces arranged along the pitch angle. The washer 34 is constructed of a softer material than that of the upper bracket section 30. The washer 34 has opposing washer sidewalls 34a, 34b which are smooth.

Operation of the washer 34 and slot 40 to provide the horizontal displacement of the upper bracket section 30 will now be discussed.

As shown at FIG. 2, when the washer 34 is aligned over the slot 40, the washer sidewalls 34a, 34b are located so as to overlap the crests 42A, but not the troughs 42B, of the teeth 42 (see FIG. 6). Thus, for the washer 34 to be received into the slot 40, it must be press-fit therein, whereduring the teeth 42 inscribably cut or deform the washer sidewalls 34a, 34b. Preferably, the washer 34 has some draft, i.e., is somewhat conically shaped, so as to facilitate its initial placement into the slot 40. It is preferred for the washer to be round in shape, but other shapes may be used.

The washer 34 is placed onto the bolt 24 and the bolt is loosely threaded into the threaded bolt hole 38 of the engine block 14, wherein the lower bracket section 28 lies thereagainst, until the washer sidewalls 36a, 36b touch the slot sidewalls 40a, 40b (see FIG. 6). The installer continues to thread the bolt into the threaded bolt hole, thereby causing the washer to be pressed into the slot along the vertical axis V. As the washer penetrates into the slot, the teeth 42 of the slot sidewalls inscribe the smooth washer sidewalls. Because of the inscribing, the washer must slide along the teeth as it is pressed into the slot. Now, since the washer is constrained by the bolt from moving along the horizontal axis H, the upper bracket section 30 must move along the horizontal axis at the slot. Thus, as the washer slides along the teeth, the pitch angle A of the teeth results in the upper bracket section at the slot moving in relation to the washer (and bolt) along the horizontal axis H toward the middle bracket section 32.

Since the lower bracket section 28 is restrained from moving horizontally by the bolt 24, the middle bracket section 32 prevents the upper bracket section 30 from moving horizontally thereat. Accordingly, the upper bracket section must bend to accommodate the horizontal movement thereof at the slot 40. Thus, a bendable portion 30a of the upper bracket section is defined between the middle bracket section 32 and the slot 40. However, in order to assure bending is predictable, it is preferred for a pre-bend 44 to be provided in the upper bracket section 30 adjacent the slot 40, whereupon the bendable portion 30a is defined between the middle bracket section 32 and the pre-bend (see FIGS. 2 and 3).

Upon the bolt 24 being tightened, the washer 34 will have moved a first predetermined distance along the vertical axis V in relation to the upper bracket section 30, which, based upon the pitch angle A, results in the upper bracket section 30 adjacent the slot 40 moving horizontally toward the middle bracket section 32 a second predetermined distance given by the relation $D*\tan(A)=X$, wherein D is the depth of penetration of the washer into the slot of the upper bracket section, A is the pitch angle of the teeth of the slot sidewalls, and X is the horizontal displacement of the upper bracket section at the slot (see FIG. 3).

The horizontal displacement X of the upper bracket section adjacent the slot 40 results in an upward bend in the bendable portion 30a. In this regard, a small horizontal displacement results in a large vertical displacement in the bendable portion 30a, wherein the "gain" is related to the ratio of the length of the bendable portion to the initial vertical height of the pre-bend thereof. An example of the vertical displacement S of the bendable portion 30a as a function of horizontal displacement X is shown by the graph depicted at FIG. 11.

The present invention uses the vertical displacement S of the bendable portion 30a of the upper bracket section 30 to vertically move the sensor body 22 away from the reluctor 18 (see FIG. 1) to thereby provide the predetermined air gap G. To accomplish this feature, the upper bracket section 30 is provided with an upper sensor aperture 46 and the lower bracket section 28 is provided with a lower sensor aperture 48, wherein the upper sensor aperture selectively engages the sensor body 22 so as to move the sensor body with it when it bends.

The upper sensor aperture 46 is provided with serrations 45 along its left and right sidewalls 46a, 46b (see FIG. 7), wherein the serrations nearly engage the sensor body 22 when it is placed thereinto, as shown at FIG. 5 (at which time the bendable portion 30a of the upper bracket section 30 has only the pre-bend). A pair of tabs 50, 52 are located, respectively, on the left and right sides of the lower bracket section 28 at the lower sensor aperture 48. The tabs 50, 52 have an upstanding section 54 and an angled section 56 whereat the tabs are acutely angled toward each other. The tabs 50, 52 preferably include an overhang section 58 which serves as a mechanical stop for preventing unrestricted vertical displacement of the bendable portion 30a. In this regard, by mechanically controlling the magnitude of the vertical displacement, minor differences in horizontal displacement resulting from manufacturing tolerances would not affect the final height of the sensor body 22. Further in this regard, the pre-bend of the upper bracket section can provide an elevation of about 6 to 8 mm so that subsequent vertical displacement would occur in a region of the bendable portion which exhibits lower "gain" and would thus be less sensitive to minor differences in horizontal displacement.

In operation of the bracket 10, the installer places the sensor body 22 into the sensor port 16 simultaneously orienting the lower bracket section 28 so that the bolt hole 38 aligns with the threaded bolt hole 26 of the engine block 14. The bolt 24 is then loosely engaged with the threaded bolt hole as described hereinabove. The installer then checks to be certain that the tip 20 of the sensor body 22 touches the reluctor 18. The installer then tightens the bolt resulting in horizontal displacement of the upper bracket section adjacent the slot and the bendable portion 30a bending upwardly, as described hereinabove.

As the bendable portion bends upwardly, the left and right sides of the upper bracket section abut the angled sections 56 of the tabs 50, 52 resulting in the upper sensor aperture 46 being increasingly squeezed. The squeezing of the upper sensor aperture causes the serrations 45 to bite into the sensor housing 22 and thereby grip it securely (see FIG. 7). Consequently, as the bendable portion 30a bends upwardly, the sensor housing 22 moves therewith vertically along the vertical axis V, as shown at FIG. 1.

Accordingly, a horizontal displacement X of the upper bracket section, results in its bending upwardly, the sensor body being grabbed, and the sensor body being lifted with the bending of the upper bracket section. Since the vertical displacement S is exactly known relative to the preselected horizontal displacement, the tip 20 of the sensor body 22 will move away from the reluctor a distance equal to the predetermined air gap G.

Figure 9:
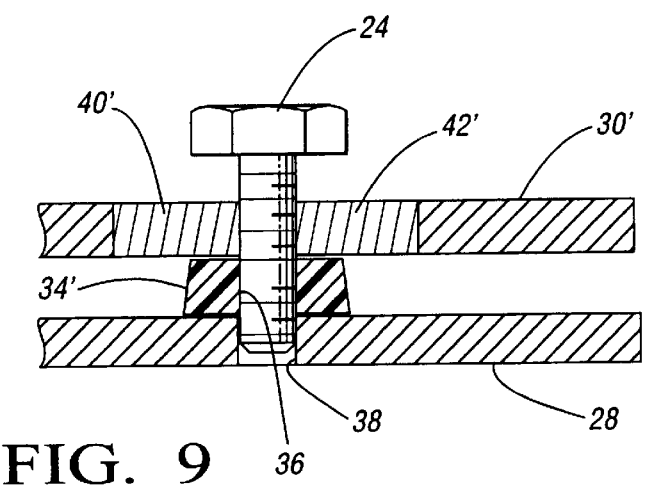
FIG. 9 is a partly sectional side view of the bracket shown in a first alternative mode of operation.

It is preferred for the sensor body 22 to be captured on the bracket 10 at either or both of the upper and lower sensor apertures 46, 48, wherein limited vertical travel is enabled relative to the bracket. For example, the sensor body may be provided with spaced apart protruding nibs or ribs which do not allow for passage through either or both of the upper and lower sensor apertures except by a press fit provided at the time of original manufacture. This feature ensures that at the time of installation on a vehicle that the magnetic sensor 12 will be properly oriented relative to the reluctor 18. Similar to the sensor body, it is preferred for the washer 34 to be captured on the bolt 24, again such as by ribs or nibs on the bolt or on the bracket such as by barbed fingers of the washer being engaged with the slot. FIG. 9 depicts a first alternative example of the washer and slot thread interaction, wherein the washer 34' is located between the upper and lower bracket sections 28, 30'. Notice the pitch angle of the teeth 40' is opposite to that of FIG. 2.

Figure 10:
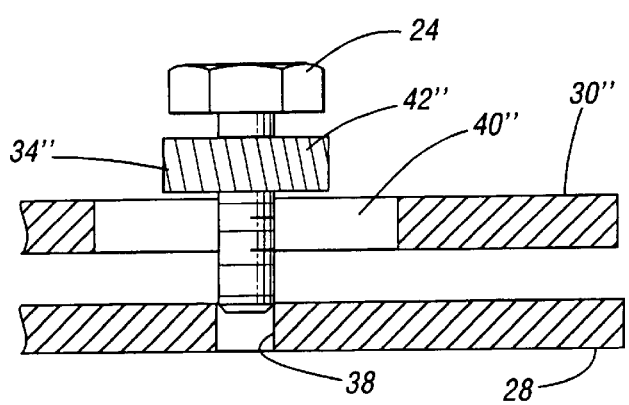
FIG. 10 is a partly sectional side view of the bracket shown in a second alternative mode of operation.

FIG. 10 depicts a second alternative example of the washer and slot thread interaction, wherein the washer 34" is located as in FIG. 2, except now the washer has the teeth 42" and the slot 40" has smooth slot sidewalls. The washer 34" is now harder than the upper bracket section 30" so that the teeth 42" will inscribe the slot sidewalls. In this example, it is preferred for the washer 34" to be rectangular or square. Further, since the orientation of the washer 34" relative to the slot 40" is critical for determining the left or right lateral movement of the upper bracket, capturing of the washer on the bolt is necessary to prevent installation error. Alternatively, the washer orientation may be one way only by operation of a non-symmetric fitting of the slot and washer, such as by each being trapezoidal rather than rectangular.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A bracket for automatically positioning a body, comprising.

a bracket having a general U-shape comprising a lower bracket section, an upper bracket section and a middle bracket section connecting with said upper and lower bracket sections;

first restraint means for restraining horizontal movement of said lower bracket section;

displacement means for causing said upper bracket section to be horizontally displaced a predetermined amount at a first location thereof remote from said middle bracket section; and grip means for selectively gripping a body to said upper bracket section at a second location between said middle bracket section and said first location;

wherein a bendable portion of said upper bracket section is bendable away from said lower bracket section responsive to said displacement means; wherein when said bendable portion bends, said second location is vertically displaced; and wherein said gripping means is capable of gripping the body so as to thereby cause the body to be vertically displaced with said second location.

2. The bracket of claim 1, wherein said upper bracket section is pre-bent at a third location adjacent said first location; wherein said bendable portion is located between said middle bracket section and said third location.

3. The bracket of claim 1, wherein said displacement means comprises:

a washer;

a slot formed in said upper bracket section at said first location, wherein said washer has a press-fit relative to said slot;

means for pressing said washer into said slot;

toothed interaction means for causing said washer to move with respect to said upper bracket section parallel to a predetermined pitch angle as said washer is pressed into said slot; and second restraint means for restraining horizontal movement of said washer.

4. The bracket of claim 3, wherein said toothed interaction means comprises:

said slot having left and right sidewalls, each of said left and right sidewalls having a plurality of teeth formed thereon, said plurality of teeth having said predetermined pitch angle; and said washer having substantially smooth surfaces for inscribably interfacing with said teeth;

wherein said upper bracket section is harder than said washer such that as said washer is pressed into said slot, said plurality of teeth inscribe said surfaces of said washer.

5. The bracket of claim 3, wherein said toothed interaction means comprises:

said washer having opposite sidewalls, each of said opposite sidewalls having a plurality of teeth formed thereon, said plurality of teeth having said predetermined pitch angle; and said slot having substantially smooth surfaces for inscribably interfacing with said teeth;

wherein said upper bracket section is softer than said washer such that as said washer is pressed into said slot, said plurality of teeth inscribe said surfaces of said upper bracket section.

6. The bracket of claim 3, wherein said grip means comprises:

said upper bracket section having an upper aperture at said second location, said upper aperture having opposing first and second aperture sidewalls, said first and second aperture sidewalls having serration means for selectively gripping the body;

a first tab connected to said lower bracket section, said first tab being acutely angled over said upper bracket section at said first aperture sidewall; and a second tab connected to said lower bracket section, said second tab being acutely angled over said upper bracket section at said second aperture sidewall;

wherein said first and second tabs squeeze said upper bracket section at said upper aperture when said bendable portion bends in response to said displacement means to thereby cause said serration means to grip the body.

7. The bracket section of claim 6, wherein said upper bracket is pre-bent at a third location adjacent said first location; wherein said bendable portion is located between said middle bracket section and said third location.

8. The bracket of claim 7, wherein said toothed interaction means comprises:

said slot having left and right sidewalls, each of said left and right sidewalls having a plurality of teeth formed thereon, said plurality of teeth having said predetermined pitch angle; and said washer having substantially smooth surfaces for inscribably interfacing with said teeth;

wherein said upper bracket section is harder than said washer such that as said washer is pressed into said slot, said plurality of teeth inscribe said surfaces of said washer.

9. The bracket of claim 7, wherein said toothed interaction means comprises:

said washer having opposite sidewalls, each of said opposite sidewalls having a plurality of teeth formed thereon, said plurality of teeth having said predetermined pitch angle; and said slot having substantially smooth surfaces for inscribably interfacing with said teeth;

wherein said upper bracket section is softer than said washer such that as said washer is pressed into said slot, said plurality of teeth inscribe said surfaces of said upper bracket section.

10. A bracket for automatically positioning a body, comprising:

a bracket having a general U-shape comprising a lower bracket section, an upper bracket section having a bendable portion and a middle bracket section connecting with said upper and lower bracket sections, said upper bracket section having an upper aperture at said bendable portion, said upper aperture having opposing first and second aperture sidewalls, said first and second aperture sidewalls having serration means for gripping a body;

a first tab connected to said lower bracket section, said first tab being acutely angled over said upper bracket section at said first aperture sidewall;

a second tab connected to said lower bracket section, said second tab being acutely angled over said upper bracket section at said second aperture sidewall;

first restraint means for restraining horizontal movement of said lower bracket section; and displacement means for causing said upper bracket section to be horizontally displaced a predetermined amount at a selected location thereof remote from said middle bracket section; and wherein said bendable portion of said upper bracket section is bendable away from said lower bracket section responsive to said displacement means;

wherein when said bendable portion bends, said upper bracket section is vertically displaced at said upper aperture; and wherein said first and second tabs squeeze said upper bracket section at said upper aperture when said bendable portion bends to thereby cause said serration means to grip the body and vertically displace the body.

11. The bracket section of claim 10, wherein said upper bracket is pre-bent at a second location adjacent said first location; wherein said bendable portion is located between said middle bracket section and said second location.

12. The bracket of claim 11, wherein said displacement means comprises:

a washer;

a slot formed in said upper bracket section at said selected location, wherein said washer has a press-fit relative to said slot;

means for pressing said washer into said slot;

toothed interaction means for causing said washer to move with respect to said upper bracket section parallel to a predetermined pitch angle as said washer is pressed into said slot; and second restraint means for restraining horizontal movement of said washer.

13. The bracket of claim 12, wherein said toothed interaction means comprises:

said slot having opposing sidewalls, each of said opposing sidewalls having a plurality of teeth formed thereon, said plurality of teeth having said predetermined pitch angle; and said washer having substantially smooth surfaces for inscribably interfacing with said teeth;

wherein said upper bracket section is harder than said washer such that as said washer is pressed into said slot, said plurality of teeth inscribe said surfaces of said washer.

14. The bracket of claim 12, wherein said toothed interaction means comprises:

said washer having opposite sidewalls, each of said opposite sidewalls having a plurality of teeth formed thereon, said plurality of teeth having said predetermined pitch angle; and said slot having substantially smooth surfaces for inscribably interfacing with said teeth;

wherein said upper bracket section is softer than said washer such that as said washer is pressed into said slot, said plurality of teeth inscribe said surfaces of said upper bracket section.

15. A method for vertically displacing a body in response to a predetermined horizontal displacement, said method comprising the steps of:

providing a generally U-shaped bracket comprising an upper bracket section, a lower bracket section and a middle bracket section connecting with said upper and lower bracket sections;

restraining horizontal movement of said lower bracket section;

horizontally displacing said upper bracket section toward said middle bracket section at a selected location remote from said middle bracket section to thereby cause said upper bracket section to bend away from said lower bracket section at a bendable portion thereof between said middle bracket section and said selected location; and holding a body to said bendable portion responsive to said bending to thereby cause the body to be vertically displaced as said bendable portion bends.

16. The method of claim 15, further comprising, before said step of horizontally displacing, the step of:

placing the body against an article;

wherein in response to said step of horizontally displacing, said body is vertically displaced from the article a distance equal to a predetermined gap.

* * * * *